Sept. 22, 1964   A. D. FURBEE ETAL   3,150,261
METHOD FOR COMPENSATING AN X-RAY ANALYZING SYSTEM
Filed March 5, 1962   2 Sheets-Sheet 1
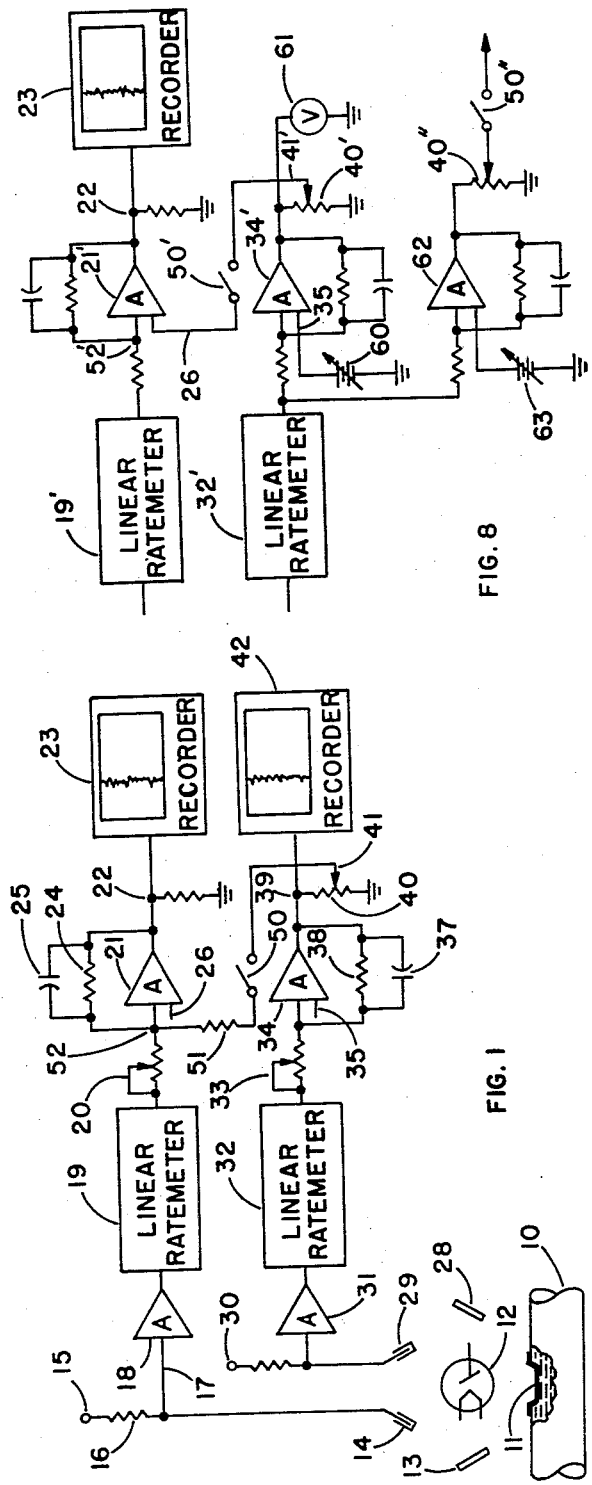
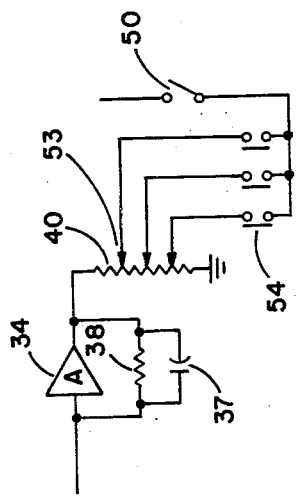
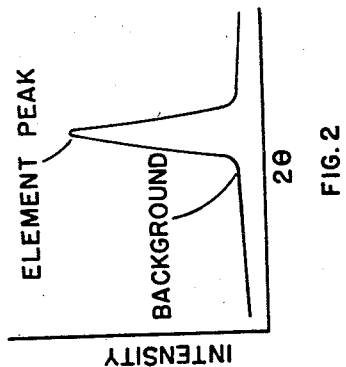
INVENTORS
AVERY D. FURBEE
FRANK BERNSTEIN
BY
ATTORNEY

United States Patent Office 3,150,261
Patented Sept. 22, 1964

3,150,261
METHOD FOR COMPENSATING AN X-RAY ANALYZING SYSTEM
Avery D. Furbee and Frank Bernstein, Milwaukee, Wis., assignors to General Electric Company, a corporation of New York
Filed Mar. 5, 1962, Ser. No. 177,549
8 Claims. (Cl. 250—51.5)

This invention relates to equipment for analyzing the composition of a sample by measuring the intensity of X-ray wavelengths emitted therefrom while being subjected to bombardment of a primary X-ray beam. The invention will be illustrated primarily in connection with a system for determining the amounts of different elements present in an unknown sample by measuring the discrete intensity of X-radiation characteristic of each element, this procedure commonly being referred to as X-ray emission analysis. More particularly, the present invention pertains to improving the accuracy of such analyzers by a novel method of compensating for the effects of variations in density of the sample on the characteristic radiation intensities.

In continuous on-line X-ray emission analysis a sample such as powdered Portland cement raw mix, sintered ore or a slurry of mine headings or tailings and the like may be analyzed for the quantity of certain elements present in order to derive information that may be used to control a manufacturing process. In any case, the sample is presented to a primary beam of X-rays emanating from a nearby tube and elements in the sample are excited to emit secondary X-rays characteristic and uniquely related to the element, provided the primary rays are sufficiently energetic. Usually, a number of diffraction crystals are located in the field of emitted radiation to monochromate or separate the various wavelengths into their individual spectra and to direct these to a radiation detector of any well known type such as Geiger-Mueller, proportional, ionization chamber or scintillation counters. The various detectors usually emit electric signals in the form of pulses whose rate depends upon the intensity of the characteristic radiation, and accordingly, the amount of the element present.

When analyzing a slurry one is usually interested in the percent of an element with respect to the solids in the slurry and not in respect to the solids plus water. The obvious reason for this is that the water is only used as a vehicle and it may vary or be drained off in which case information on the percent of an element with respect to solids plus liquid would be deceiving if not useless. The present invention proposes to derive information similar to that obtained by the customary mineral assay; that is, the percent of an element of interest with respect to the solids constituting the mineral.

It has been found in the course of analyzing slurries that the calibrated relationship between the amount of an element in the solids of the slurry and the corresponding derived output signal may be erroneous when the solids-to-liquid ratio varies during an analysis. For instance, in analyzing mine tailings in a water slurry for the amount of molybdenum present, when this element is bound in a compound like molybdenum sulphide, the total amount of the solids present in the slurry with respect to the amount of water vehicle has an appreciable effect upon the characteristic X-ray intensity and the electric signal it produces, and accordingly, the accuracy of the molybdenum channel readout. A noticeable effect is observed on the output signals of other channels of the analyzer as well although the alteration is not always in the same direction for an increase in density of the slurry may cause the signal output from certain element channels to increase while others may decrease.

It is a general object of the present invention to improve the accuracy of single and multiple element X-ray analysis apparatus.

Another object is to continuously compensate and correct the signal, indicative of the quantity of an element present, for variations which are caused by density changes in the sample.

Still another object is to provide means for conveniently standardizing the analyzer output or checking its accuracy against its original calibration at selected intervals.

A more specific and significant object is to derive a density compensation signal from radiation emitted by the sample and to do this employing only one and the same primary radiation source. In one version of the invention it is an object to derive a single compensating signal that may be divided to produce individual compensating signals of different values and polarities applicable to correct the individual channels of the analyzer simultaneously.

Achievement of the foregoing and other more specific objects will appear from time to time throughout the course of this specification.

In general terms, the invention entails presenting a sample having a number of qualitatively known but quantitatively unknown elements to a primary beam from X-ray tube for excitation and emission of radiation characteristic of the elements present. There is usually provided a diffracting crystal whose character is such that for each element a distinct characteristic wavelength or spectrum may be directed into an X-ray detector like one of those mentioned above. The geometrical relationship between the sample, crystal and detector may be according to the Bragg relationship which is too well known to justify further discussion here.

Each X-ray detector emits electric pulses at a rate dependent upon element quantity and with an amplitude dependent upon the quantum energy of characteristic radiation which it intercepts. The crystal may be eliminated in some cases when a detector is used that is most sensitive to one wavelength band in which case it may view the sample directly or through filters. Such detectors are known in the art and depend for their inherent radiation discriminating ability upon a proper choice of ionization gas filling, pressure and upon applied voltage. In most cases the signals, usually pulses, derived from the detectors are individually amplified in each channel. The amplified pulses are fed into a ratemeter which has a mono-stable oscillator that is triggered by each incoming pulse of predetermined amplitude range to produce output pulses of uniform amplitude but equal to the input rate. The uniform pulses are integrated or filtered in an RC circuit, resulting in production of a D.C. voltage related to characteristic radiation intensity of each element. This D.C. signal may be supplied to an operational amplifier whose D.C. output is proportional to its input. The output voltage from the operational amplifier is an analog of the amount of element present and this voltage is usually indicated on a chart recorder or used on a servo device that controls the process. An array including an X-ray detector, its optics, when used, and the amplifying and integrating means terminating in a usable output signal indicative of the quantity of one element will hereinafter be termed an element channel.

The means for compensating for density variations of the sample may include a radiation detector that is sensitive to a particular wavelength band, or more specifically, one that is tuned to measure the intensity of a suitable background radiation wavelength from the sample and whose intensity variations bear some predetermined relationship to density for which one desires to compensate insofar as it adversely affects readings from the element channel or channels. The electronics is in the compensating channel are similar to those in the element channel and they may comprise a detector, at times a diffracting crystal, amplifier, ratemeter and one or more operational amplifiers or other electronic analogue computing circuits. Any suitable electronics that result in production of an electric signal that varies with the effect for which correction is sought is satisfactory. As will appear subsequently, the system is distinguished by its capability for uniquely determining the proper compensation to be made and by coaction between the element and compensating channels to compensate for the density variable on a continuous basis. The invention is further characterized by the ease with which the analyzer may be standardized as an incident of the density compensating scheme.

An illustrative embodiment of the invention will now be described in conjunction with the drawing in which:

FIG. 1 is a schematic representation of an X-ray emission analyzer embodying the invention;

FIG. 2 is a graph of X-ray intensity versus Bragg angles that facilitates explaining the invention;

FIG. 3 is a modification of a part of the circuitry shown in FIG. 1;

Figure 7:
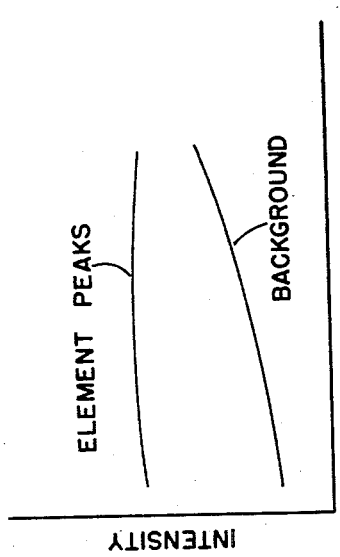
FIGS. 5, 6 and 7 illustrate how the peak and background radiation may vray with respect to different elements in a sample as the solids-to-liquid ratio of the sample changes but as the absolute amount of the element remains constant; and, FIG. 8 is a modification, with parts removed, of the schematically represented analyzer of FIG. 1.

FIG. 1 depicts an X-ray emission analyzer having one channel for determining the quantity of an element present in a sample and one channel for deriving a signal that enables compensating the element channel for density variations in the sample which would affect the accuracy of the element amount read out in the absence of compensation. Ordinarily, the user is interested in the quantity variations for several different elements in the sample in which case there are a corresponding number of element channels. One or more compensating channels may be used, depending on circumstances which will be explained below.

In the present example, the sample to be analyzed may be in the form of a slurry flowing through a presenter pipe 10 as part of a process for separating chosen metals from mine tailings. The quantity of an element present may be useful information for controlling subsequent or prior steps in the process. Pipe 10 may be provided with an X-ray permeable window 11, preferably of a low atomic number element like beryllium which may have an organic material like "Mylar" on its surface inside the pipe to reduce abrasive and chemical effects of the slurry on the beryllium, while maintaining a rigid window. An X-ray tube 12 located above and close to window 11 projects its primary radiation on the slurry which is thereby excited to emit secondary radiations whose wavelengths and energies are characteristic of the elements in the sample.

An element channel begins with a diffraction crystal 13 that selects a monochromatic radiation from one element and directs it into X-ray detector 14 which may be a Geiger-Mueller counter operating in the proportional range. When a positive direct voltage of appropriate value is applied at point 15, through a decoupling resistance 16, electric pulses appear on line 17 which are fed to a pulse amplifier 18. The height of the pulses depend upon the energy of the radiation received by the detector 14 when operated as a proportional counter and, as a general rule, the pulse rate depends upon the quantity of incoming radiation, and hence, the quantity of the element in the sample. As is well known, twice the angle of diffraction between the plane of the crystal's atomic planes and the line of sight to the detector is the Bragg or two theta angle which can be selected in order to tune the system to detect an element by moving the detector angularly.

The pulses are amplified in 18 and delivered to a known type of ratemeter 19 which includes a mono-stable oscillator that is triggered by incoming pulses to produce outgoing pulses of uniform amplitude but equal in number to the incoming pulses. The uniform pulses are integrated or filtered in an RC circuit not shown in detail, but which results in production of a D.C. output signal from ratemeter 19 that varies in value essentially with variations in X-ray intensity.

This D.C. output signal passes through an adjustable gain control resistor 20 whereupon it enters an operational amplifier 21 whose D.C. output voltage appearing on point 22 is proportional to the input and is an analog voltage of the quantity of an element present in the slurry. The analog voltage may be exhibited on a chart recorder 23 as a scribed line whose position on a graduated chart indicates the element quantity directly, assuming an initial calibration with known samples has been made.

Operational amplifier 21 is feedback stabilized in a well known manner with a resistor 24, capacitor 25 combination and is usually also used to filter the incoming signal which fluctuates due to the statistical nature of the X-ray intensity. The operational amplifier may have two inputs, one as connected for input signals of one polarity and another 26 for signals of opposite polarity. An operational amplifier having these features is typified by the type K2–W available from the Philbrick Researches Co.

As stated earlier it has been observed that the signal value appearing at point 22 of the element channel and displayed on recorder 23 does not always vary in direct proportionality with the different quantities of the element which may be present in the solids of a slurry sample. It has been discovered that the principal part of this error results from the density or ratio of solids-to-liquid, constituting the slurry, varying from time to time. Accordingly, the present invention provides for a density compensating channel to account for these variations when constructed and operated in a manner now to be described.

The density compensating channel may have substantially similar X-ray optical and electronic components as the element channel. The compensating channel comprises a crystal 28, detector 29, detector voltage source 30, pulse amplifier 31, ratemeter 32, gain control resistor 33 and operational amplifier 34 all of which function similarly to their counterparts in the element channel, but possibly at different energy levels. The operational amplifier may again have an alternative polarity input point 35. A similar feedback coupling in the form of a capacitor 37 and resistor 38 is provided. The output signal may appear at a point 39 on a voltage divider means like resistor 40 that has an adjustable tap 41. The output signal level may again be displayed on a recorder 42 although the recorder is not indispensable in the compensating channel.

In a preferred arrangement the compensating channel has its crystal geometrically related to the detector in such manner that the detector 29 does not sense radiation from any element present in the sample, but rather, it senses a radiation wavelength found in the white radiation spectrum from X-ray tube 12 and which is considered background radiation from the slurry or other sample. It is desirable, however, to tune crystal 28 angularly so that detector 29 measures a radiation wavelength that corresponds with the characteristic wavelength for a specific element not in the sample. The reason for this is that tuning the crystal so that detector 29 sees a maximum intensity is facilitated by permitting placing the specific element in the X-ray tube beam and turning the crystal 28 until the output signal on recorder 42 maximizes.

The radiation measured by detector 29 is background radiation scattered by the slurry sample and this is, in reality, comparable with the background radiation whose variations adversely affect the output of the element channel. This background radiation generally increases as the quantity of the liquid vehicle, usually water, increases. Stated in another way, the background decreases as the ratio of solids-to-liquid increases.

The X-ray optics may also be of the non-dispersive variety. That is, the crystal 28 may be dispensed with in some cases and the background radiation may be measured by having the detector 29 exposed directly to background radiation diffusely scattered through window 11 from the slurry in presenter pipe 10. In this instance, the detector 29 may be sensitized for a distinct spectral band by using a proper gas filling in it. Considerations for effecting gas discrimination are known in the art. Choosing a particular detector voltage may help contribute to this result. Lastly, the desired background spectral band may be chosen by interposing a filter, not shown, between the window 11 and detector 29 to eliminate all but the desired radiation band.

Figure 4:
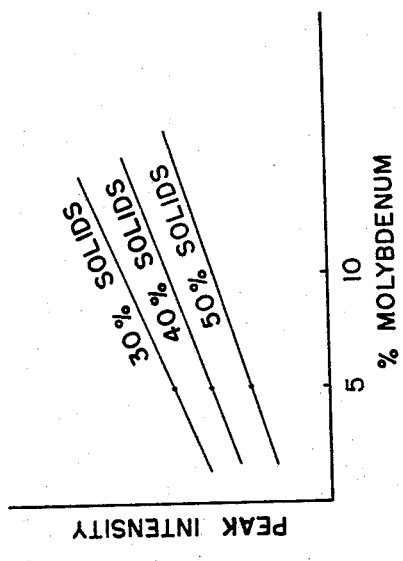
FIG. 4 is a graph showing how X-ray emission calibrating curves may vary for an element when the solids-to-liquid ratio of the samples change.

Ordinarily the output signal of the element channel, expressed in pulse counts per second from the detector 14 or as an analog voltage representative of incoming radiation intensity, comprises a part contributed by the characteristic radiation from the element of interest and a part contributed by background detected in the same channel. If the background had an absolute value and were constant it would be a simple matter to subtract its value from the element channel signal so that the remainder or net signal would represent that due solely to the element. This cannot be done, however, because the net intensity due to the element is usually dependent upon the ratio of solids-to-liquids in the slurry as well as upon background. This is partially illustrated in FIG. 4 which uses as an example the determination of molybdenum combined as molybdenum sulphide in a mine tailings slurry. It will be observed that for any specific constant percentage of molybdenum in the solids of the slurry that the intensity or element output signal depends upon the percentage of solids in the slurry. For instance, with five percent of molybdenum in the sample, three different intensities are readable as ordinates indicated by dots where the density or solids is plotted for the three values from thirty to fifty percent. Other constant percentages of molybdenum also have different ordinates representing their peak intensities that are dependent upon the amount of solids, and conversely, the amount of water in the slurry.

In FIG. 2 one may observe that the net intensity or output signal due to the element at a particular two theta angle is determined by the peak value minus the background that exists at that angle and for that element. It is usually desirable to measure the background at a two theta angle as near as possible to the element peak where no interference exists but actually any background location sensitive to density variations and not interfered with by an element in the system can be used. With molybdenum, for instance, at a two theta angle of 20.3 degrees for its K alpha spectra which is at .709 A. (Angstroms), one may measure background at a two theta angle about 2.2 degrees off peak which corresponds with the zirconium K alpha spectra having a wavelength of 7.86 A. As stated, the background in the molybdenum channel will rise and fall with the density of the slurry almost linearly within the working range. See FIG. 5 for example where the background is compared with the peak intensities of the same absolute amount of molybdenum over a percentage range of water in the slurry. It is evident from FIG. 5 that if the molybdenum channel readout is to be independent of liquid-to-solid ratio, the aforementioned readout must be reduced by some suitable function, which function applies a successively larger correction as the percent water increases. Over a limited range of liquid-to-solid ratio, this can be accomplished by subtracting the molybdenum background signal from the molybdenum plus background signal. The background intensity is not an absolute value, however, that can be directly deducted from the total radiation intensity of the element and its background. Rather, in the more general case the net output signal or net intensity for the element of interest is a function of the total intensity and the background. The determination of this functional relationship and the utilization of it for performing a continuous compensating action will now be described.

The ensuing explanation applies to correcting for density variations for an element typified by molybdenum compounds in a slurry. This is the case where, as in FIG. 5, the locus of the intensity peaks of element plus background describes a line with substantially the same slope as that due to the background alone over the working range of solid-to-liquid but with a constant amount of element. Stated in another way, if the background effect for each percent water is subtracted from the corresponding peak, the molybdenum line would lie horizontally as it should for a constant absolute quantity in the solid.

A procedure for establishing density compensation settings will now be set forth. Adjustment of density compensation circuits is accomplished by introducing a slurry sample in presenter 10 in which it is assumed that the percent of molybdenum disulphide is held constant while density is varied in a controlled manner. With switch 50 closed introduce a slurry with density determined by weighing in presenter pipe 10 and output is observed on recorder 23. Water is then added to the slurry, and its density is measured by weighing and the element channel output for the new solid-to-liquid ratio but same element quantity is observed. The voltage divider means potentiometer 41 in the background channel is then adjusted until there appears no change in the element channel for more or less water. The element channel is then compensated for all background factors that are density dependent and the analyzer is ready for calibration for the absolute amount of an element versus the value of the analog output signal.

At this time water only may be introduced into presenter 10 and the molybdenum or element channel and the density channel read and recorded. In many cases the readings taken on water may be used later to standardize in order to correct for electronic drift and the like. It is then only necessary to re-admit water and adjust the density compensating channel output until the element channel and density channel read the values mentioned in the preceding sentence. This will account for any proportional errors but it may be advisable to determine whether the analyzer is reading accurately after months of operation by again making the tests with the slurry just discussed.

In some cases such as are encountered in the measurement of iron in iron ore slurries, it is observed that the peak intensities of the iron decreases due to increased water in the slurry. For example where there is a fixed amount of an element with respect to the total solids, the output signal or peak intensities decline or slope negatively merely due to increased water in the slurry while the background rises somewhat non-linearly and with a positive slope. This is exemplified by the element iron in FIG. 6. In practice, the water content of the slurry is held to reasonably close tolerances so that it is ordinarily safe to assume that, over the working range, the peak and background curves vary linearly although with opposite slope. Where this assumption is reasonable and where the slopes are opposite it is necessary to introduce a correction signal that increases as the density decreases or as percent water in the slurry increases. One method of accomplishing this is illustrated in FIG. 8 which is the same as FIG. 1 up to ratemeters 19 and 32 in the respective element and compensating channels but which is modified to include a manually adjustable D.C. source 60 that may introduce a bucking voltage into operational amplifier 34 which voltage, when switch 50' is opened, is made equal to the output voltage from ratemeter 32' in the density channel when a slurry of average density is introduced into pipe presenter 10. By average density is meant a density equal to the mid-point value for the range of slurry densities likely to be encountered. The proper setting for D.C. source 60 that results in zero output may be observed on a null type voltmeter 61 or other convenient voltage recording device. With the average density sample in the presenter 10 the iron channel will read some value on chart recorder 23. Then by causing the slurry density to vary while the concentration of iron in the solids remains constant, resistor 40' is adjusted with switch 50' closed until the output signal from the iron channel is the same as was obtained using the average sample density. This means that regardless of slurry density, the iron channel will read the same constant value for constant iron content in the sample solids.

The density channel is now ready for operation. It may provide a relatively positive or negative correction voltage to the input of operational amplifier 21' from resistor 40' in accordance with whether percent solids increase or decrease. The required gain setting of the operational amplifier 34' remains reasonably constant for limited ranges of solid-to-liquid ratios as will generally be the case in practice. After the initial settings on the iron and density compensating channels have been made, the readings on chart 23 and voltmeter 61 should be taken for pure water. In those instances where the counting rate as obtained from the stream sample is reasonably near those obtainable from water, or where such intensity levels are insufficient from water, a fixed solid standard sample or liquid sample may be introduced into the instrument. In subsequent operation, the water or otherwise prepared sample may be used as a standardizing substance by adjusting the outputs of the elements and background channels to their predetermined levels.

FIG. 7 shows the third case where the element intensity remains substantially constant as the slurry water content increases whereas the background increases approximately linearly. The curves of FIG. 7 are based upon a slurry containing an element in a fixed amount with respect to the solids but where only the water varies. Here, no density compensation is necessary. This would be the ideal case where a constant amount of an element yields a constant characteristic radiation intensity regardless of density variations. It may not be encountered in many practical cases, and obviously in this instance, no density compensation would be required for the element intensity.

Figure 5:
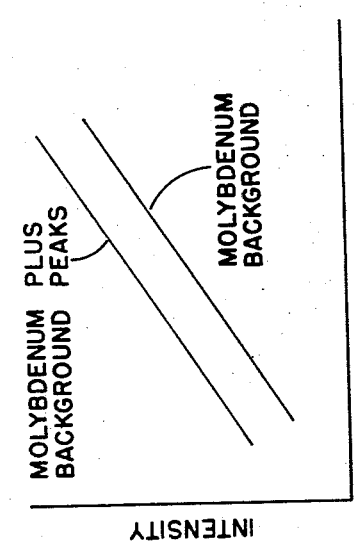
Figure 6:
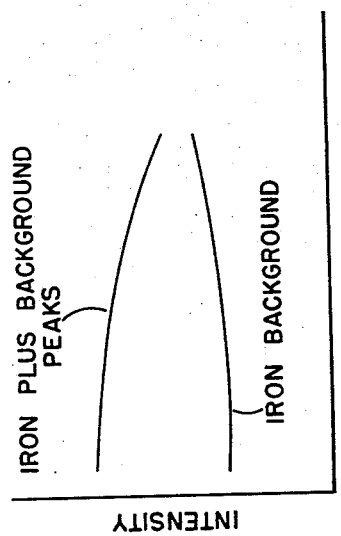

From the foregoing few paragraphs and in view of FIGS. 5, 6 and 7 it is seen that in order to maintain the net intensity of the element on a horizontal line when the element remains constant and only the water content varies, it is necessary to make the compensating signal a different function of background for almost every element. Algebraically added corrections and those involving negative and positive multipliers for background are obtainable by properly adjusting voltage divider 41. Those versed in the art of electronics will appreciate, however, that any background correction intensity curve and its relationship to the element intensity curve can be simulated or analogued with electronic circuits. For instance, a suitable network, not shown, may replace the voltage divider resistor 40 to produce a non-linear or exponential compensation. A simple example is connecting a negative resistance-current characteristic material like silicon carbide in series with the linear resistor 40 to yield a voltage at a tap thereon which corresponds with the background level for various amounts of water.

One may also arrange the compensating channel to provide different compensation over different ranges of solid-to-liquids ratio in order to account for non-linearity over parts of the background and element intensity curves. The correction appropriate to the operating region may be achieved by tapping the resistor 40 at various places as illustrated in FIG. 3 where there are a number of taps 53 in series with contacts 54. These contacts may be operated by relays, not shown, under control of a multi-position range switch, not shown. The contacts 54 may be interlocked so only one is closed at a time.

The same density compensating channel can often be used to compensate a number of different element channels. In the simplest case it is only necessary to tap off different voltages from potentiometer-divider 40 by providing it with additonal taps like 41. This method may be achieved by modifying FIG. 3 to eliminate contacts 54 and by running directly from the taps 53 to the inputs of operational amplifiers in various element channels. In other cases more complicated networks may be needed to produce different polarity correction signals or different functional relationships, but these are too variegated to describe all of them and such description is unnecessary since they are producible by those versed in the electronic art.

In certain cases it is possible to compensate more than one element channels with a single density responsive signal from one ratemeter. For example, the ratemeter 32' used to compensate the iron element channel in FIG. 8 may be connected to supply part of its signal to other operational amplifiers 62 which may develop a different value or even opposite polarity voltage on the output resistor 40'' which may be fed to an element channel as formerly through a switch 50''. Likewise, a different bucking or boosting voltage appropriate to the situation may be introduced from a separately variable D.C. source 63.

From the foregoing discussion it may be seen that the invention may be characterized by three mathematical expressions. The general case is one where the corrected readout (CR) of the element channel is some function ($f$) of the peak intensity due to the element ($I_e$) and the intensity due to background ($I_{bg}$):

$$CR = f(I_e, I_{bg})$$

A more specific case is one where stream density changes can be compensated for by subtracting background from the element channel intensity as in the illustration of molybdenum in a slurry of mine tailings:

$$CR = I_e - I_{bg}$$

Another case is where the element intensity readout has one slope or shape with respect to changing solid-to-liquid ratio and the background has another slope or shape:

$$CR = I_e + K(I_b - I_{bo}),$$

where the corrected readout is equal to the element intensity ($I_e$) plus an experimentally determined factor (K) times the difference between the background reading ($I_b$) taken at the same time as ($I_e$) and the background reading ($I_{bo}$) for the slurry that represents the average density.

Thus far it has been shown how the element channels of the analyzer are precorrected for variations which may occur in them due to background and solids-to-liquid ratio changes. When this procedure is completed the analyzer is ready for calibration, that is, for preparing a working curve that relates analog voltage manifested on a chart recorder like 23 with absolute amounts of the element being measured. Calibration is initiated by introducing into presenter 10 a sample in which the element quantity has been determined by chemical analysis. This is repeated for various percentages of the element lying within the expected practical range. Each amount will produce a definite deflection on the chart that is free from the influence of density changes in the sample. These values are plotted against the percentages of the element and a working curve is prepared that permits reading off the amount of element for any observed value on the recorder.

A converse calibration procedure is also used where slurry samples of varying element content are run through the presenter. Each time a change is noted on the recorder a sample is quickly extracted for later analysis and subsequently related to the chart readout and plotted. With either procedure density variations are of no consequence because the analyzer has already been compensated for them.

The plot of element concentration versus readout, that is, the working curve, may be a straight line or other shape which is immaterial for visual readout. When output analog signal is used to control a process, however, it may be digitalized or otherwise handled by a computer that indirectly controls valves, motor speeds and the like which affect the process or constitution of the sample being analyzed.

The analyzer may be standardized at any time by running water through the presenter or by inserting a solid or liquid standard sample in the presenter as indicated earlier and restoring the system on the same signal values then obtained. A quantity of slurry having known elemental composition and density may also be run through after extended operation and adjustment made. This may be desirable after weeks of operation in order to account for such things as wear of presenter window 11, change in the X-ray optics due to mechanical or thermal shock, etc.

In conclusion, illustrative apparatus and methods have been described for accomplishing compensation for variations in element intensity peaks that are due to fluctuations in the density of a slurry or in the ratio of solids-to-liquids. Fundamentally, the element and compensating channels are adjusted so that the compensating signal is caused to vary with density in such manner that it continuously applies the proper correction for any dependent relationship of the element intensity on the sample density.

Although the discussion has revolved around use of particular electronic devices to analyze typical samples, such discussion is to be interpreted as illustrative rather than limiting for the invention may be variously practiced and embodied. Its limits are to be determined only by construing the claims which follow.

It is claimed:

1. An X-ray emission analyzer comprising an X-ray beam source and means for presenting to the beam a sample whose proportion of solids-to-liquid and elemental composition in the solids are subject to variations, said sample then emitting radiation that is characteristic of an element in the sample along with background radiation, a first measuring channel including a first X-ray detector means that produces electric signals whose magnitude is dependent on the joint effect of the characteristic and the background radiation intensities, a second measuring channel including a second X-ray detector means that produces electric signals whose magnitudes are dependent substantially on the background radiation intensity, said background radiation intensity varying with the variations of the solids-to-liquids in the sample and effecting the signals out of each channel in a functionally related manner, circuit means for introducing the signal due to background radiation into the first channel and for continuously modifying the magnitude of the output signal of the first channel so it corresponds essentially with element quantity variations in the sample, and means for determining the functional relationship between signals in each channel comprising means for adjusting the signal of the background channel until the signal out of the first channel remains substantially the same when samples of different density but the same element quantity are presented to the beam.

2. The invention set forth in claim 1 wherein said background channel includes an amplifier for the signal related to background intensity, voltage divider means in the output circuit of said amplifier across which a voltage related to the background intensity is produced, and means for taking a voltage from said voltage divider means at a value representative of the said functional relationship, said voltage being introduced into said element channel.

3. The invention set forth in claim 1 wherein said background channel includes an amplifier with an output terminal and at least two input terminals one of which admits the signal related to background intensity, a manually adjustable voltage source supplying the other input, said voltage source being manually adjustable to interact with the input signal due to background in such manner as to produce a predetermined output signal from said amplifier when a sample of certain density is in the beam, a voltage divider means in said output circuit across which a voltage related to the background intensity is produced, an amplifier in said element channel having an input terminal for the signal due to the element and its background radiation and another input terminal for the signal from the density compensating background channel, said voltage divider means feeding said last named input terminal.

4. The invention set forth in claim 1 wherein there are more than one element channels each of which includes an amplifier having an input terminal, a plurality of other amplifiers each of which has first and second input terminals and an output terminal, circuit means for introducing the common electric signal due to background radiation into a first terminal of the other amplifiers, each output terminal from the said other amplifiers being in circuit with a voltage divider means on which is developed independent density compensating voltage signals, the last said voltage signals being introduced respectively into an input terminal of an element channel amplifier.

5. The invention set forth in claim 1 including in the density compensating background channel an amplifier which has an input terminal to which the single signal due to density variations is admitted, an output terminal on said amplifier and a multiple tapped resistor in circuit therewith, each of said resistor taps having a separate density compensating voltage value, a plurality of element channels and an amplifier in each having an input terminal for the signal due to the radiation intensity in the channel, each last named input terminal being in circuit with a different tap on said resistor, whereby different density compensating signals may be introduced into different element channels.

6. The invention set forth in claim 1 including in the density compensating channel an amplifier which has an input terminal to which the single signal due to background radiation is admitted, an output terminal on said amplifier, a plurality of paralleled resistors and a switch contact in series with each of them, said resistors and contacts in series being connected in common with said output terminal and to another common point, whereupon selective closing of a contact will change the voltage at the common point, said element channel also having an amplifier with an input terminal for a signal due to radiation in the element channel, said last named input terminal being connected to said common point whereby a range of density compensating signals may be selectively introduced into the element channel.

7. An X-ray emission analyzer comprising an X-ray source and means for presenting a sample to the beam from the source for exciting in one channel X-radiation that is characteristic of an element in the sample together with background radiation that adversely affects the determination of the characteristic radiation by itself, another channel for separately measuring background radiation from the sample and for determining its relationship to the background radiation associated with the characteristic radiation, said element channel including an X-ray detector means and a ratemeter means responsive thereto by producing a first electric signal dependent upon the intensity of the characteritsic and background radiation, an operational amplifier having an input terminal receiving said first signal and an output terminal for an output signal, said background radiation channel including an X-ray detector means and a ratemeter means responsive thereto by producing a second electric signal dependent upon the intensity of the background radiation, an operational amplifier having an input terminal receiving said second signal and an output terminal for a compensating output signal, a voltage divider means conducting said compensating output signal, a switch means for placing an input terminal of the amplifier in the element channel in circuit with the voltage divider means, and means for adjusting the voltage divider means until the compensating signal causes the output signal in the element channel to hold its same value when samples are presented with different solid-to-liquid ratios but with a constant percentage of an element with respect to the solids whereby to establish a functional relationship between the intensity due to background and the element in the element channel and the background channel.

8. The invention set forth in claim 7 including an operational amplifier in the background channel that has two input terminals, one terminal receiving said second signal due to background radiation alone, a manually adjustable D.C. source supplying the other input terminal, said D.C. source being adjustable to cancel said second signal for some value of background radiation intensity, the aforesaid voltage divider means thereby developing a compensating signal that changes polarity positively or negatively from the value it had when the second signal was cancelled.

References Cited in the file of this patent

UNITED STATES PATENTS

| | | |
|---|---|---|
| 2,316,239 | Hare | Apr. 13, 1943 |
| 2,442,752 | Armstrong | June 8, 1948 |
| 2,897,367 | Andermann et al. | July 28, 1959 |
| 2,939,960 | Gunn | June 7, 1960 |
| 2,959,932 | Spergel et al. | Nov. 15, 1960 |